United States Patent
Shinoda et al.

(10) Patent No.: US 8,786,543 B2
(45) Date of Patent: Jul. 22, 2014

(54) PROGRAM, INFORMATION STORAGE MEDIUM AND IMAGE GENERATION SYSTEM

(75) Inventors: Tetsuya Shinoda, Yokohama (JP); Takeshi Ono, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 1899 days.

(21) Appl. No.: 11/367,409

(22) Filed: Mar. 6, 2006

(65) Prior Publication Data

US 2006/0202982 A1    Sep. 14, 2006

(30) Foreign Application Priority Data

Mar. 9, 2005    (JP) ................................. 2005-065563

(51) Int. Cl.
*G09G 5/00*    (2006.01)

(52) U.S. Cl.
USPC .............................. 345/156; 345/173; 345/55

(58) Field of Classification Search
USPC ........................................... 345/156, 173, 55
See application file for complete search history.

(56) References Cited

U.S. PATENT DOCUMENTS

| | | | | |
|---|---|---|---|---|
| 5,137,277 | A | * | 8/1992 | Kitaue ............................... 463/2 |
| 6,002,808 | A | * | 12/1999 | Freeman ........................ 382/288 |
| 6,010,403 | A | * | 1/2000 | Adam et al. ....................... 463/6 |
| 7,062,157 | B2 |   | 6/2006 | Iwai et al. |

FOREIGN PATENT DOCUMENTS

| | | |
|---|---|---|
| JP | A-2000-339485 | 12/2000 |
| JP | A-2002-52250 | 2/2002 |
| JP | 2002-282541 | * 10/2002 |
| JP | A-2002-282541 | 10/2002 |

OTHER PUBLICATIONS

"Shukan Fami-Tsu," Enterbrain, Inc., Jan. 28, 2005, No. 843,249 (w/partial English Translation).

* cited by examiner

*Primary Examiner* — William Boddie
*Assistant Examiner* — Leonid Shapiro
(74) *Attorney, Agent, or Firm* — Oliff PLC (57) ABSTRACT

An image generation system including: an image generation section which generates an image; a path recognition section which performs recognition processing of a path of an input by a user, based on input information of the input from an input section which allows the user to input an arbitrary shape; and a size information generation section, wherein the image generation section generates a path image indicating the path based on the input information and a production image in accordance with the size of the path based on the size information.

21 Claims, 8 Drawing Sheets

| INPUT TIME | COORDINATE POSITION | | ANGLE |
|---|---|---|---|
| | X | Y | |
| 0 | 240 | 50 | — |
| 1 | 260 | 60 | 135 |
| 2 | 280 | 70 | 180 |
| ⋮ | ⋮ | ⋮ | ⋮ |

| NAME | TIME | ANGLE |
|---|---|---|
| CLOUD | 0 | — |
| | 1 | 135 |
| | 2 | 180 |
| | ⋮ | ⋮ |
| ⋮ | ⋮ | ⋮ |

PROGRAM, INFORMATION STORAGE MEDIUM AND IMAGE GENERATION SYSTEM

Japanese Patent Application No. 2005-65563, filed on Mar. 9, 2005, is hereby incorporated by reference in its entirety.

BACKGROUND OF THE INVENTION

The present invention relates to an image generation method, a program, and an image generation system for generating an image corresponding to a path input by a user.

A processing device has been provided which recognizes a character or a figure input by a user using a touch panel display or the like and generates an image.

However, since such a processing device generates an image using only recognized data, such a processing device lacks interesting effect production.

In order to solve such a problem, JP-A-2002-282541 discloses a game device for proceeding with a game by providing a new image based on a hand-written image input by a player, for example.

Specifically, FIG. 4 of JP-A-2002-282541 illustrates a hand-written bomb image and a hand-written image of a value "5" positioned inside the bomb. In FIG. 4 of JP-A-2002-282541, the game device decrements the value inside the bomb and generates an image in which enemy characters are involved in bomb explosion when the value has reached "0".

In FIG. 7 of JP-A-2002-282541, the game device generates an image in which the mouth of a hand-written character is opened and shut.

In FIG. 5 of JP-A-2002-282541, the game device compares a hand-written input image with a dictionary pattern, and, when the input image has been recognized to be a predetermined image, performs processing corresponding to the type of the recognized image.

However, the method disclosed in JP-A-2002-282541 merely transforms the original input image, in which a new image differing from the hand-written image is not added to the hand-written image.

Therefore, since the area of the hand-written image almost coincides with the area of the image added, a change in the image is small.

Moreover, it is important to produce effects corresponding to the size of a path input by the user in order not to provide an unnatural image to the user.

SUMMARY

According to a first aspect of the invention, there is provided an image generation method, comprising:

image generation step for generating an image;

path recognition step for performing recognition processing of a path of an input by a user, based on input information of the input from an input section which allows the user to input an arbitrary shape; and size information generation step for generating size information indicating size of the path, wherein the path recognition step determines whether or not the path satisfies a predetermined condition; and wherein, when the path satisfies the predetermined condition, the image generation step generates a path image indicating the path based on the input information and a production image in accordance with the size of the path based on the size information.

According to a second aspect of the invention, there is provided a program which is used for generating an image, the program causing a computer to function as:

image generation means for generating an image;

path recognition means for performing recognition processing of a path of an input by a user, based on input information of the input from an input section which allows the user to input an arbitrary shape; and size information generation means for generating size information indicating size of the path, wherein the path recognition means determines whether or not the path satisfies a predetermined condition; and wherein, when the path satisfies the predetermined condition, the image generation means generates a path image indicating the path based on the input information and a production image in accordance with the size of the path based on the size information.

According to a third aspect of the invention, there is provided an image generation system, comprising:

image generation means for generating an image;

path recognition means for performing recognition processing of a path of an input by a user, based on input information of the input from an input section which allows the user to input an arbitrary shape; and size information generation means for generating size information indicating size of the path, wherein the path recognition means determines whether or not the path satisfies a predetermined condition; and wherein, when the path satisfies the predetermined condition, the image generation means generates a path image indicating the path based on the input information and a production image in accordance with the size of the path based on the size information.

BRIEF DESCRIPTION OF THE SEVERAL VIEWS OF THE DRAWING

FIGS. 2A and 2B are views showing production of a cloud and rain according to one embodiment of the invention, wherein

DETAILED DESCRIPTION OF THE EMBODIMENT

The invention may provide an image generation method, a program, and an image generation system capable of producing effects corresponding to the size of a path input by a user.

According to one embodiment of the invention, there is provided an image generation method, comprising:

image generation step for generating an image;

path recognition step for performing recognition processing of a path of an input by a user, based on input information of the input from an input section which allows the user to input an arbitrary shape; and size information generation step for generating size information indicating size of the path, wherein the path recognition step determines whether or not the path satisfies a predetermined condition; and wherein, when the path satisfies the predetermined condition, the image generation step generates a path image indicating the path based on the input information and a production image in accordance with the size of the path based on the size information.

According to one embodiment of the invention, there is provided a program which is used for generating an image, the program causing a computer to function as:

image generation means for generating an image;

path recognition means for performing recognition processing of a path of an input by a user, based on input information of the input from an input section which allows the user to input an arbitrary shape; and size information generation means for generating size information indicating size of the path, wherein the path recognition means determines whether or not the path satisfies a predetermined condition; and wherein, when the path satisfies the predetermined condition, the image generation means generates a path image indicating the path based on the input information and a production image in accordance with the size of the path based on the size information.

According to one embodiment of the invention, there is provided an image generation system, comprising:

image generation means for generating an image;

path recognition means for performing recognition processing of a path of an input by a user, based on input information of the input from an input section which allows the user to input an arbitrary shape; and size information generation means for generating size information indicating size of the path, wherein the path recognition means determines whether or not the path satisfies a predetermined condition; and wherein, when the path satisfies the predetermined condition, the image generation means generates a path image indicating the path based on the input information and a production image in accordance with the size of the path based on the size information.

The above embodiments allows the image generation system and others to generate the size information and generate the production image corresponding to the size of the path based on the size information. Therefore, the image generation system and the like can produce effects acceptable to the user corresponding to the size of the path input by the user.

According to the above embodiments, since the image generation system and others can generate the image in which the production image is displayed in an area differing from the area of the path image by generating the production image differing from the path image, various images which differ to a large extent can be generated.

The size of the path may be at least one of lengths including:

a length of at least one side of a first rectangular area including the path;

a length of at least one side of a second rectangular area included in the path;

a length of the path;

a length of a characteristic portion of the path; and a length based on these lengths, for example.

In each of the image generation system, the program and the image generation method, the image generation means (or step) may generate the production image based on a position of the path and one of the lengths, a size of the production image being adjusted based on the lengths.

This allows the image generation system and others to produce effects acceptable to the user by generating the production image corresponding to the position and the size of the path.

The image generation system may further comprise:

timing information generation means for generating timing information, wherein the image generation means generates an image in which at least one of a position, shape, color, pattern, and size of the production image changes with time, based on the timing information.

The program may cause the computer to function as:

timing information generation means for generating timing information, wherein the image generation means generates an image in which at least one of a position, shape, color, pattern, and size of the production image changes with time, based on the timing information.

The image generation method may further comprise:

timing information generation step for generating timing information, wherein the image generation step generates an image in which at least one of a position, shape, color, pattern, and size of the production image changes with time, based on the timing information.

According to this configuration, since the image generation system and others can change the production image with time, various effects which differ to a large extent can be produced.

In each of the image generation system, the program and the image generation method, the image generation means (or step) may generate an image in which at least one of a position, shape, color, pattern, and size of the path image changes with time, based on the timing information.

According to this configuration, since the image generation system and others can change the path image with time, various effects which differ to a large extent can be produced.

In each of the image generation system, the program and the image generation method, the image generation means (or step) may generate an image in which the path image and the production image are deleted at a predetermined time, based on the timing information.

According to this configuration, since the image generation system and others can delete the path image and the production image, the image generation system and others can generate a normal image after completion of the effect production or produce other effects.

In each of the image generation system, the program and the image generation method, the path recognition means (or step) may determine whether or not the path satisfies the predetermined condition by determining whether or not the path matches a predetermined shape.

This allows the image generation system and others to produce effects when the path coincides with the predetermined shape (e.g. cloud or nose shape).

In each of the image generation system, the program and the image generation method, the path recognition means (or step) may determine whether or not the path satisfies the predetermined condition by performing at least one of a determination whether or not a color of the path matches a predetermined color and a determination whether or not an area enclosed by the path is in a predetermined state.

This allows the image generation system and others to produce effects based on the color or the state of the path.

The image generation system may further comprise:

storage means for storing path data for generating the path image, shape data indicating the predetermined shape, and production data for generating the production image, wherein the path data indicates an input time, a coordinate position at the input time, and an angle formed by a line segment which connects the coordinate position at the input time and a coordinate position at a preceding input time and a line segment which connects the coordinate position at the input time and a coordinate position at a subsequent input time; and wherein the shape data indicates the input time and the angle.

The program may cause the computer to function as:

storage means for storing path data for generating the path image, shape data indicating the predetermined shape, and production data for generating the production image, wherein the path data indicates an input time, a coordinate position at the input time, and an angle formed by a line segment which connects the coordinate position at the input time and a coordinate position at a preceding input time and a line segment which connects the coordinate position at the input time and a coordinate position at a subsequent input time; and wherein the shape data indicates the input time and the angle.

The image generation method may further comprise:

storage step for storing path data for generating the path image, shape data indicating the predetermined shape, and production data for generating the production image, wherein the path data indicates an input time, a coordinate position at the input time, and an angle formed by a line segment which connects the coordinate position at the input time and a coordinate position at a preceding input time and a line segment which connects the coordinate position at the input time and a coordinate position at a subsequent input time; and wherein the shape data indicates the input time and the angle.

According to this configuration, since the image generation system and others can determine shape matching by comparing the input time and the angles, the image generation system and others can more efficiently determine shape matching in comparison with the case of comparing the path image with the shape pattern in pixel units.

In each of the image generation system, the program and the i image generation method, the input section and an area in which the image generated by the image generation means (or step) is displayed may be formed as a touch panel display.

According to this configuration, since the image generation system and others can generate the path image in association with the indicated position by a pen or the like and determine shape matching after completion of the indication to generate the production image corresponding to the size of the path image, a more intuitive effect production can be achieved.

The image generation system may further comprise:

sound information generation means for generating sound information for outputting sound based on the size information, volume of the sound being adjusted according to the size.

The program may cause the computer to function as:

sound information generation means for generating sound information for outputting sound based on the size information, volume of the sound being adjusted according to the size.

The image generation method may further comprise:

sound information generation step for generating sound information for outputting sound based on the size information, volume of the sound being adjusted according to the size.

This allows the image generation system and others to produce sound corresponding to the size of the path image.

This invention is described below with reference to the drawings taking an example of applying the invention to an image generation system included in a game device having a touch panel display. Note that the embodiments described below do not in any way limit the scope of the invention laid out in the claims herein. In addition, not all of the elements of the embodiments described below should be taken as essential requirements of the invention.

Embodiment

Figure 1:
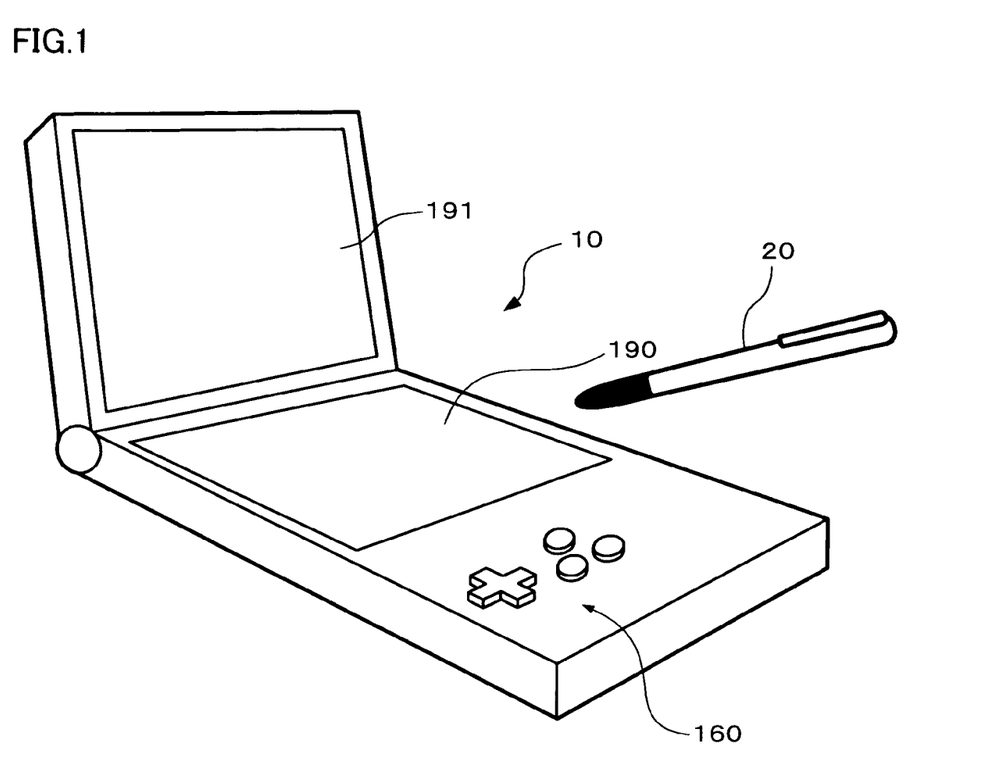
FIG. 1 is a general view of a game device according to one embodiment of the invention.

FIG. 1 is a general view of a game device 10 according to this embodiment.

The game device 10 includes a touch panel display 190, a display 191, and an operation section 160. The game device 10 includes an image generation system which generates a game image.

A player plays a game by drawing a path (arbitrary shape) on the touch panel display 190 using a pen 20.

Figure 2A:
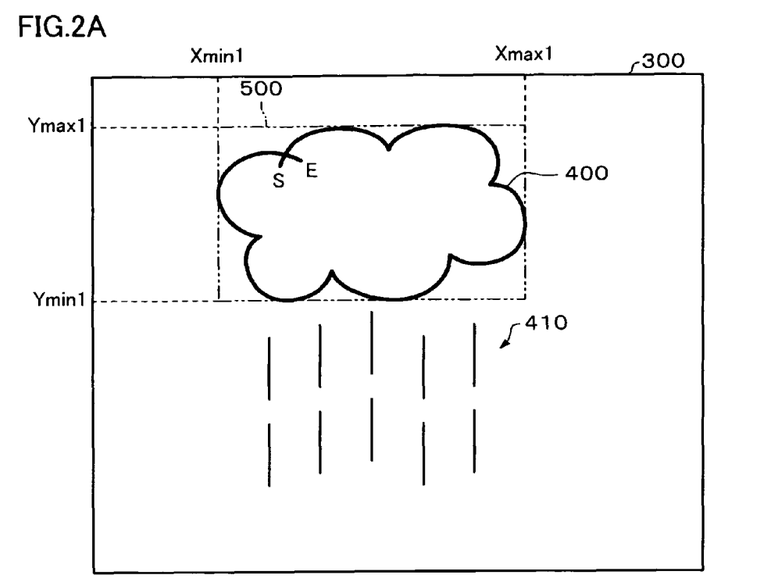
FIG. 2A is a view showing a rain production image when the cloud is large.
Figure 2B:
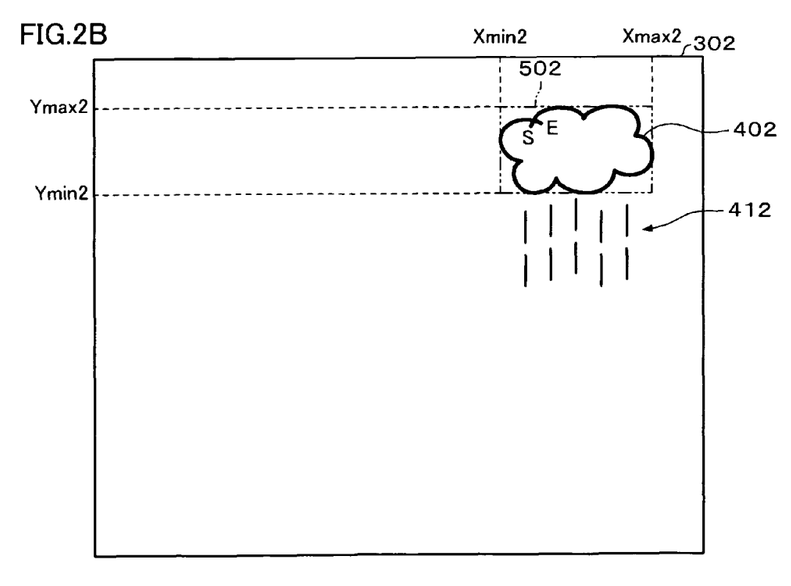
FIG. 2B is a view showing a rain production image when the cloud is small.

FIGS. 2A and 2B are views showing production of a cloud and rain according to this embodiment. FIG. 2A is a view showing a rain production image 410 when the cloud is large, and FIG. 2B is a view showing a rain production image 412 when the cloud is small.

For example, when the player has drawn a cloud by moving the pen 20 from a start point S to an end point E on the touch panel display 190, the game device 10 displays a path image 400 indicating the path drawn by the player using the pen 20 on the touch panel display 190.

When the path drawn by the player coincides with a predetermined shape such as that of a cloud, the game device 10 displays the production image 410 corresponding to the shape of the path at a position differing from the path image 400. For example, when the shape drawn by the player is a cloud, the game device 10 displays an image 300 including the production image 410, which is a moving image in which raindrops move downward, and the path image 400.

The game device 10 displays the production image 410 corresponding to the size of a rectangular area 500 which encloses the path image 400. For example, when the path image 400 is large as shown in FIG. 2A, the interval between the raindrops or the like in the production image 410 is increased corresponding to the width of the rectangular area 500. On the other hand, when a path image 402 is small as shown in FIG. 2B, the interval between the raindrops or the like in a production image 412 is decreased corresponding to the width of a rectangular area 502.

The game device 10 can produce effects acceptable to the user by displaying the production image 410 corresponding to the size of the path image 400 as described above.

Functional blocks for implementing such a function by the game device 10 are described below.

Figure 3:
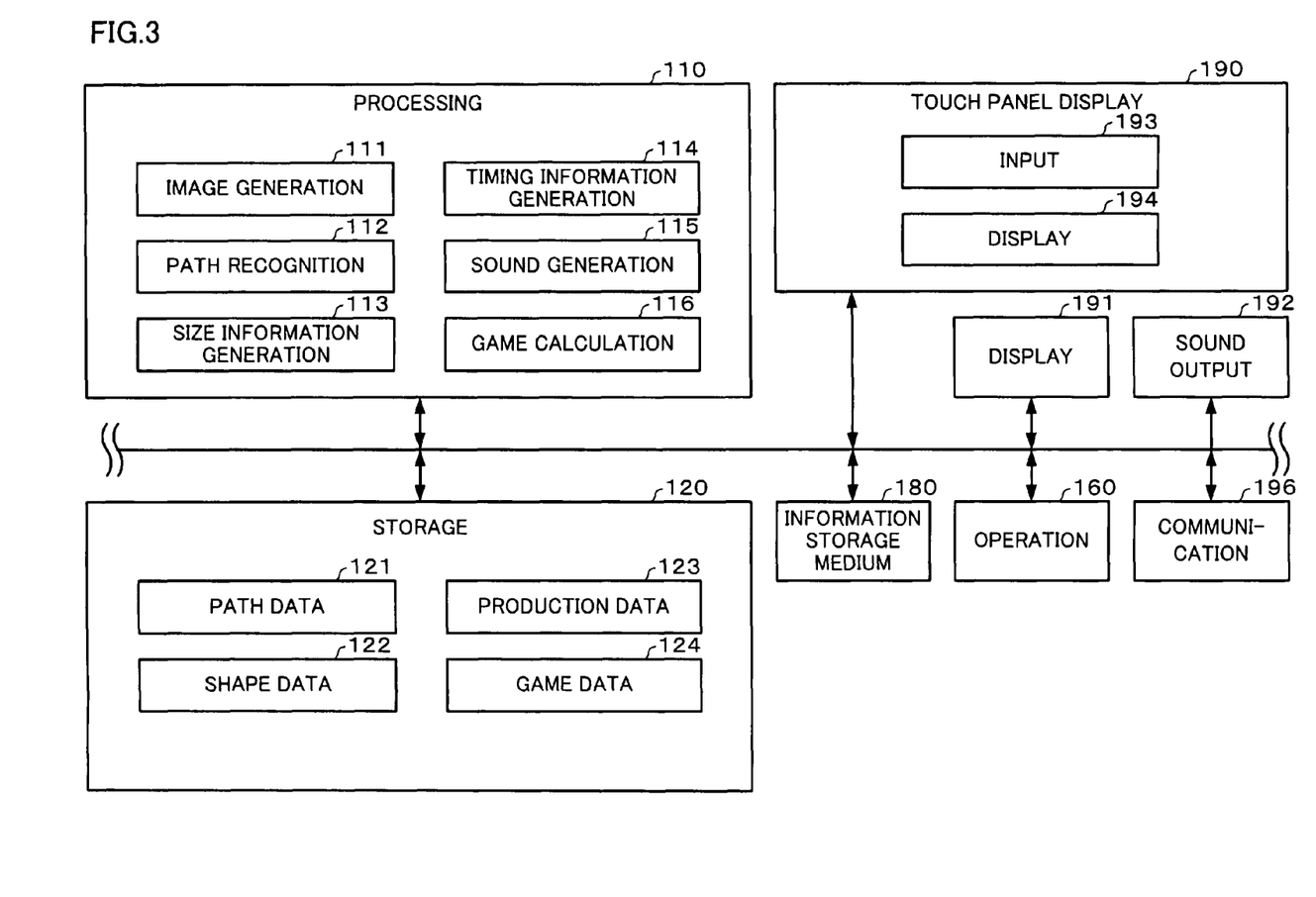
FIG. 3 is a functional block diagram of a game device according to one embodiment of the invention.

FIG. 3 is a functional block diagram of the game device 10 according to this embodiment.

The game device 10 includes a processing section 110 which generates an image or the like, a storage section 120 which stores various types of data, the touch panel display 190, the display 191, a sound output section 192, the operation section 160, a communication section 196, and an information storage medium 180.

The processing section 110 includes an image generation section 111 which generates an image such as the image 300, a path recognition section 112 which performs recognition processing of a path of an input by the player, a size information generation section 113 which generates size information indicating the size of the path, a timing information generation section 114 which generates timing information, a sound generation section 115 which generates sound information, and a game calculation section 116 for proceeding with a game.

The touch panel display 190 includes an input section 193 which receives an input using the pen 20 and generates input information indicating the coordinates and the input time of the pen 20, and a display section 194 which displays an image generated by the image generation section 111.

The storage section 120 includes path data 121 indicating the path of the coordinates of the pen 20, shape data 122 indicating a predetermined shape such as a cloud, production data 123 for generating the production image 410 such as raindrops, and game data 124 used for proceeding with a game.

Each section may be implemented by a computer using a CPU, image processing circuit, timer, or the like as the processing section 110, a RAM or the like as the storage section 120, a button, lever, or the like as the operation section 160, a speaker or the like as the sound output section 192, and a wireless LAN module or the like as the communication section 196, for example.

The display 191 may be implemented by a computer using a known LCD or the like, and the touch panel display 190 may be implemented by a computer using a known touch panel display or the like.

The functions of the image generation section 111 and the like may be implemented by causing a computer to read a program from the information storage medium 180. As the information storage medium 180, a storage medium (e.g. game cartridge) using a laser, magnetism, or the like may be applied, such as a CD-ROM, DVD-ROM, IC card, ROM, RAM, memory card, or HDD. The program may be read from the information storage medium 180 using a contact method or a noncontact method.

A shape input method using the touch panel display 190 and an input shape determination method are described below.

Figure 4:
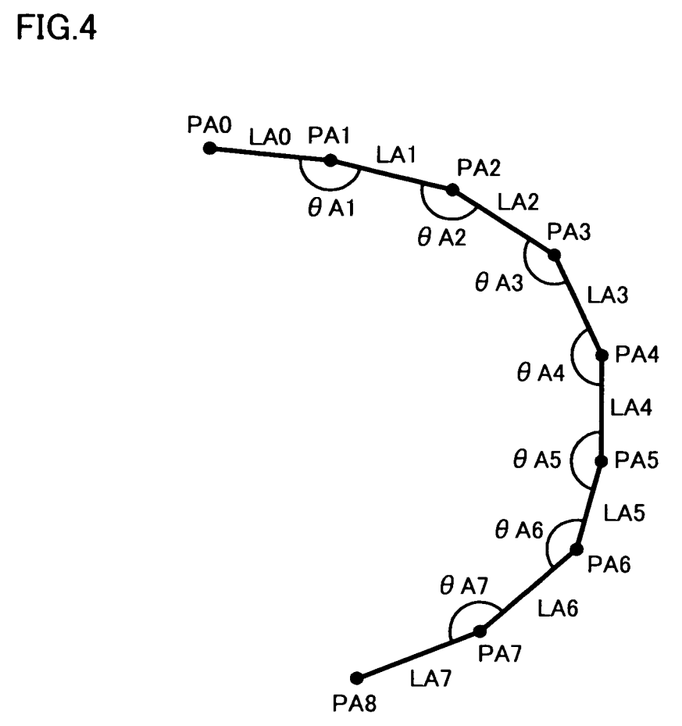
FIG. 4 is a schematic view showing coordinate positions and angles formed by line segments based on the coordinate positions according to one embodiment of the invention.
Figure 5:
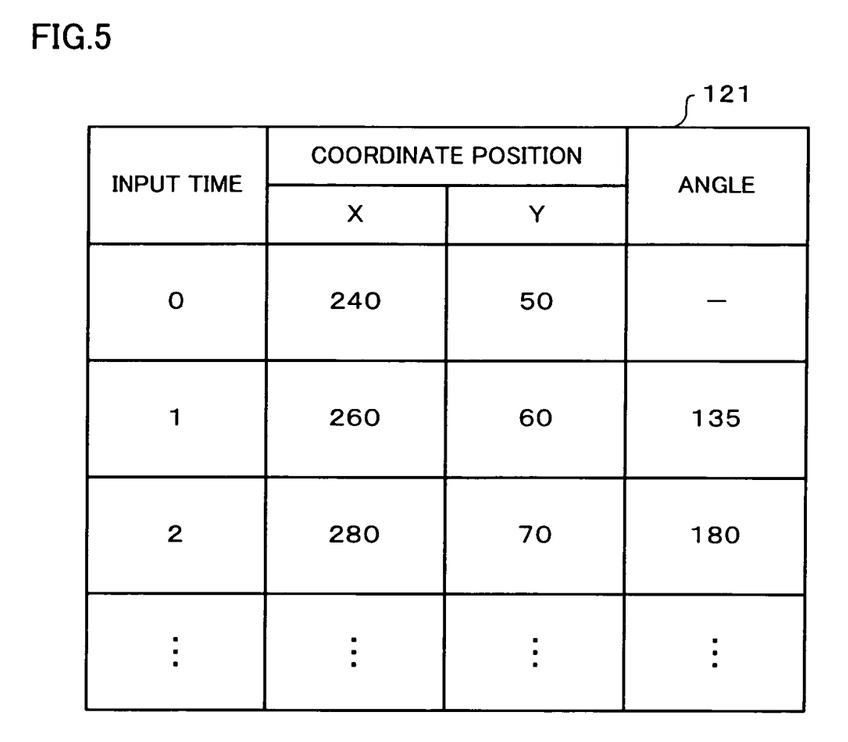
FIG. 5 is a view showing the data structure of path data according to one embodiment of the invention.
Figure 6:
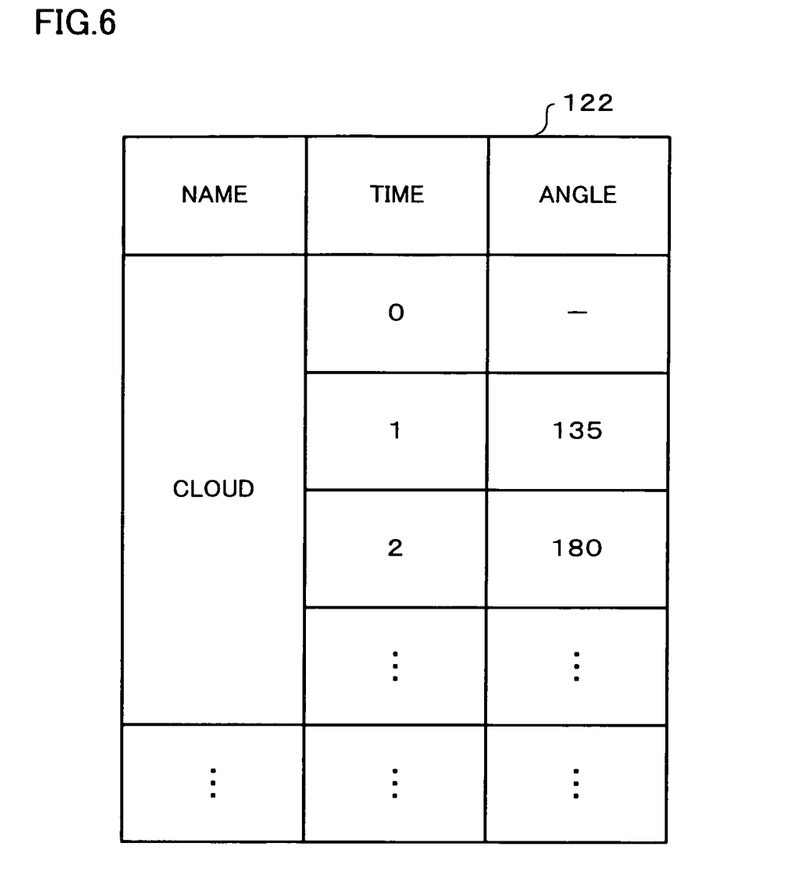
FIG. 6 is a view showing the data structure of shape data according to one embodiment of the invention.

FIG. 4 is a schematic view showing coordinate positions and angles formed by line segments based on the coordinate positions according to this embodiment. FIG. 5 is a view showing the data structure of the path data 121 according to this embodiment. FIG. 6 is a view showing the data structure of the shape data 122 according to this embodiment.

In FIG. 4, PA0 indicates the start point S (pen-down position) of the touch position, and PA8 indicates the end point E (pen-up position) of the touch position. When the player inputs data using the pen 20, the coordinate data of the touch positions PA0 to PA8 is input to the input section 193 in frame (predetermined cycle) units, for example.

The path recognition section 112 calculates line segments LA0 to LA7 between the touch positions based on the information input from the input section 193, and calculates angles Theta A1 to Theta A7 formed by the line segments. For example, the path recognition section 112 calculates the line segment LA0 between the touch positions PA0 and PA1 and the line segment LA1 between the touch positions PA1 and PA2, and calculates the angle Theta A1 formed by the line segments LA0 and LA1. The path recognition section 112 stores the coordinate data of the touch positions PA0 to PA8 and the angle data Theta A1 to Theta A7 in the storage section 120 as the path data 121.

As shown in FIG. 5, the path data 121 is data indicating the input time, the X and Y coordinate positions at the input time, the angle formed by the line segments at the input time, and the like.

As shown in FIG. 6, the shape data 122 is data indicating the shape name, time, and angle at each time. In FIG. 6, the shape name is used for convenience of description. Note that various types of identification information such as an ID may also be used. The shape data 122 and the production data 123 are associated with each other using the name or ID. This allows the image generation section 111 to generate the production image 410 using the production data 123 corresponding to the shape recognized by the path recognition section 112.

The path recognition section 112 matches (collates) the input shape with the shape data 122 indicating the shape pattern registered in advance as dictionary data. As a predetermined method of matching the input shape with the shape pattern, the similarity between the angle data of the path data 121 and the angle data of the shape data 122 may be calculated, for example. When the number of pieces of angle data of the path data 121 is not the same as the number of pieces of angle data of the shape data 122, the path recognition section 112 may calculate the similarity after equalizing the number of pieces of angle data of the path data 121 and the number of pieces of angle data of the shape data 122 by interpolation or thinning. When the path recognition section 112 has determined that the input shape has a high degree of similarity (correlation) with a predetermined shape pattern, the input shape is determined to match the predetermined shape pattern.

As described above, the path recognition section 112 can simply and efficiently determine the similarity between a complicated shape such as a cloud and the shape pattern by using the angle data for shape matching.

The processing flow from the input of the input information to the effect production using each section is described below.

Figure 7:
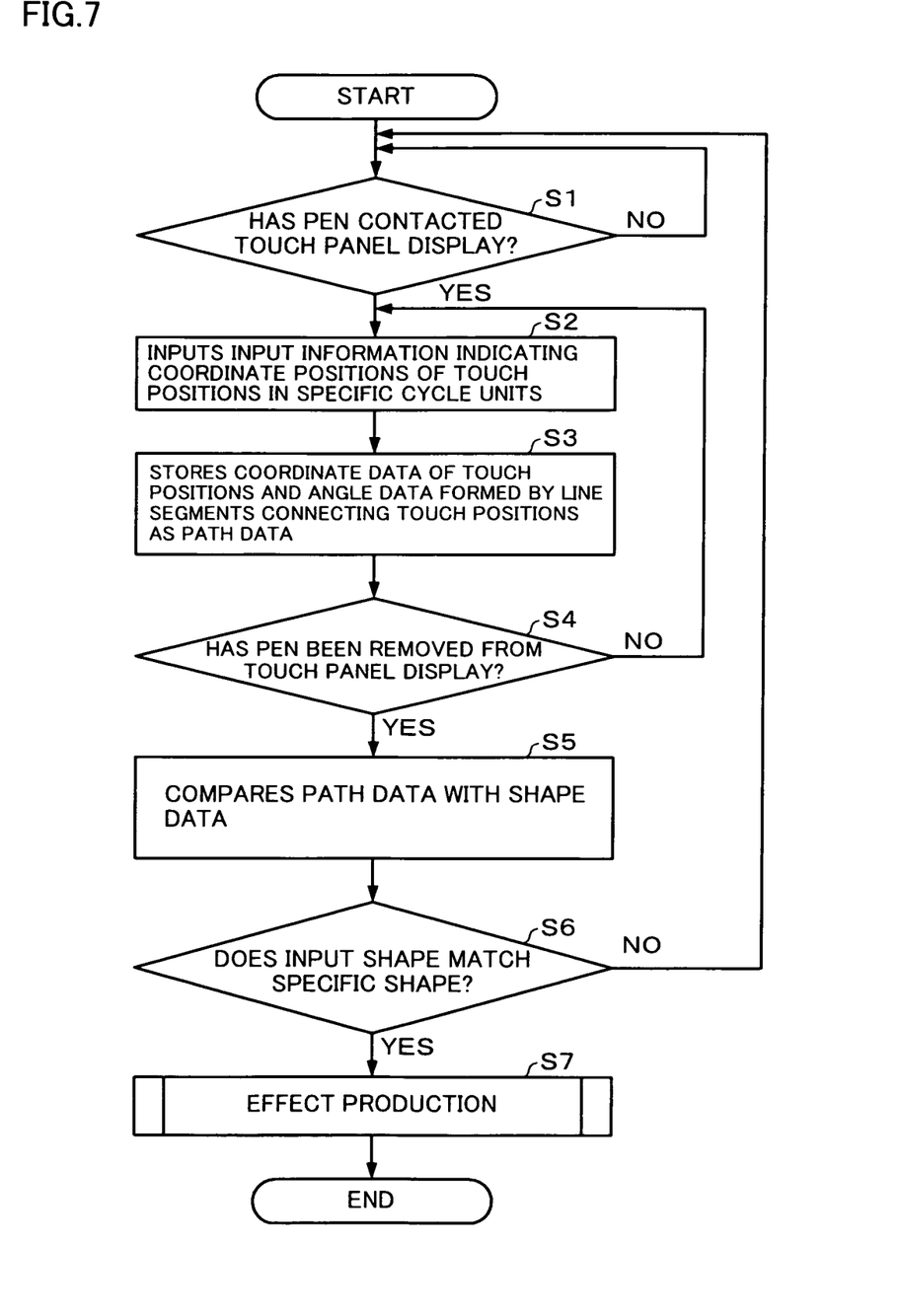
FIG. 7 is a flowchart showing processing flow from input of input information to effect production according to one embodiment of the invention.

FIG. 7 is a flowchart showing the processing flow from the input of the input information to the effect production according to this embodiment.

The input section 193 determines whether or not the pen 20 has contacted the touch panel display 190 (step S1).

When the input section 193 has determined that the pen 20 has contacted the touch panel display 190, the input section 193 generates input information indicating the coordinate positions of the touch positions in predetermined cycle (predetermined time) units, as described with reference to FIG. 4 (step S2).

The path recognition section 112 stores the coordinate data of the touch positions and the data of the angles formed by the line segments connecting the touch positions in the storage section 120 as the path data 121 based on the input information (step S3). The image generation section 111 generates the path image 400 almost in real time based on the input information.

The input section 193 determines whether or not the pen 20 has been removed from the touch panel display 190 (step S4).

When the input section 193 has determined that the pen 20 has been removed from the touch panel display 190, the path recognition section 112 compares the input shape (path data 121) with the shape pattern (shape data 122) registered in a dictionary (step S5). The processing in the steps S2 and S3 is repeatedly performed until the pen 20 is removed from the touch panel display 190.

When the path recognition section 112 has determined that the input shape matches a predetermined shape pattern (step S6), the game device 10 produces effects such as generating the production image 410 corresponding to the predetermined shape pattern and the size of the input shape (step S7). When the path recognition section 112 has determined that the input shape does not match the shape pattern, the path recognition section 112 clears the path data 121, and the image generation section 111 deletes the path image 400.

The flow of effect production according to this embodiment when the input shape is a cloud is described below.

Figure 8:
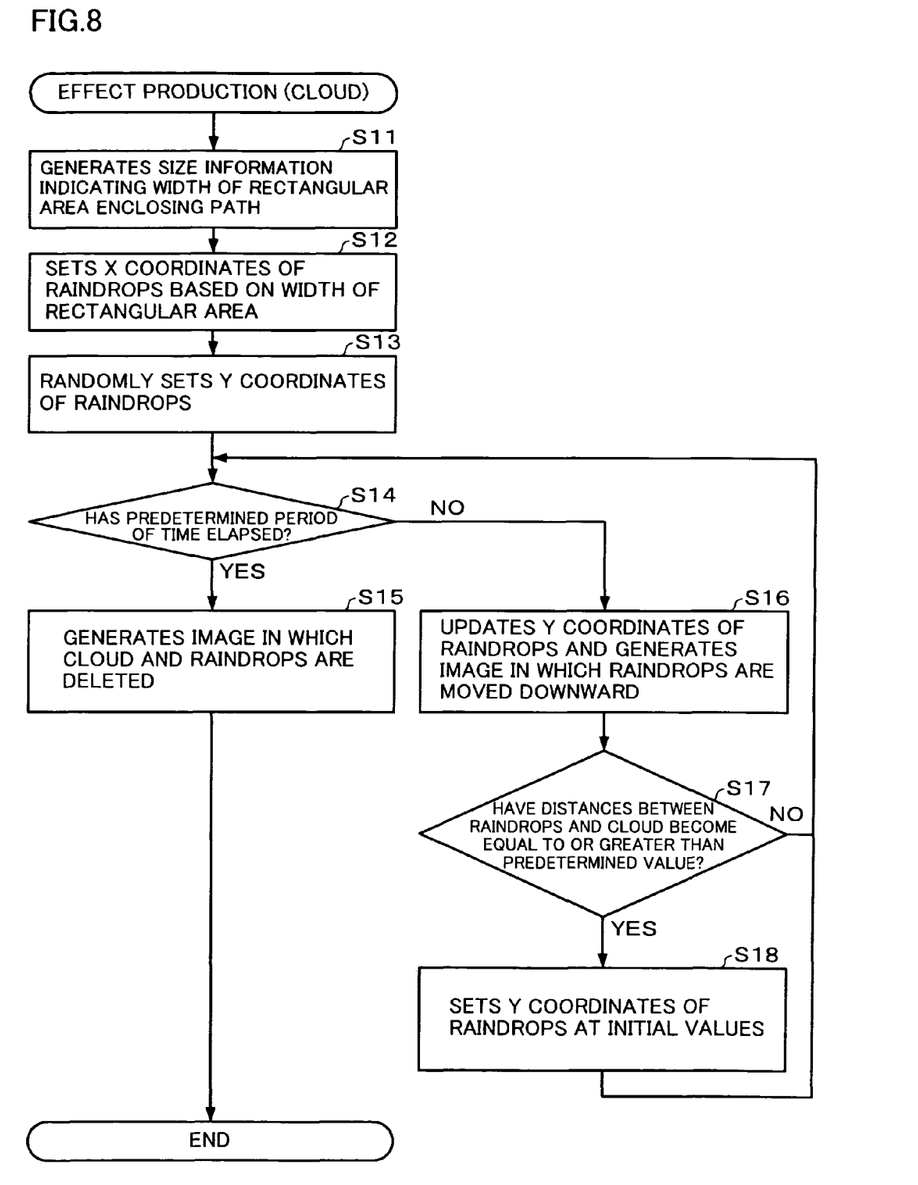
FIG. 8 is a flowchart showing flow of effect production according to one embodiment of the invention.

FIG. 8 is a flowchart showing the flow of effect production according to this embodiment.

The size information generation section 113 generates the size information indicating the width of the rectangular area 500 enclosing the path (step S11). In more detail, the size information generation section 113 may calculate the width of the rectangular area 500 as shown in FIG. 2A by calculating the difference between a maximum value Xmax1 and a minimum value Xmin1 of the X coordinate positions of the path data 121 shown in FIG. 5. The size information generation section 113 may calculate the height of the rectangular area 500 by calculating the difference between a maximum value Ymax1 and a minimum value Ymin1 of the Y coordinate positions of the path data 121.

The image generation section 111 determines effects produced when the input shape is a cloud based on the production data 123. For example, the image generation section 111 divides the width of the rectangular area 500 into six portions based on the size information, and sets the X coordinates of raindrops at five boundary points among the seven boundary points excluding the boundary points on both ends (step S12).

The image generation section 111 randomly sets the Y coordinates of the raindrops (step S13). The image generation section 111 causes the Y coordinates of the raindrops to differ from one another, as shown in FIG. 2A, by randomly setting the Y coordinates.

The image generation section 111 determines whether or not a predetermined period of time has elapsed from the start of effect production based on the timing information from the timing information generation section 114 (step S14). As the timing information, information indicating the date, time, frame number of the generated image, or the like may be applied.

When the image generation section 111 has determined that the predetermined period of time has not elapsed, the image generation section 111 updates the Y coordinates of the raindrops and generates the image 300 including the production image 410 in which the raindrops move downward (step S16). The display section 194 displays the image 300 including the path image 400 and the production image 410 generated by the image generation section 111 on the touch panel display 190.

The image generation section 111 determines whether or not the distances between the raindrops and the cloud have become equal to or greater than a predetermined value, that is, whether or not the raindrops have been positioned near the lower end of the image 300 based on the current Y coordinates of the raindrops and the position (Ymin1) of the lower end of the rectangular area 500 (step S17).

When the image generation section 111 has determined that the distances between the raindrops and the cloud have become equal to or greater than the predetermined value, the image generation section 111 sets the Y coordinates of the raindrops at the initial values (e.g. values set in the step S13) (step S18).

The above processing allows the image generation section 111 to generate a moving image as if the raindrops fall from the cloud.

When the image generation section 111 has determined that the predetermined period of time has elapsed from the start of effect production, the image generation section 111 generates an image in which the cloud and the raindrops (path image 400 and production image 410) are deleted (step S15).

The above processing allows the image generation section 111 to complete the effect production within a predetermined period of time, whereby the image generation section 111 can generate a normal image after completion of the effect production or produce other effects.

As described above, this embodiment allows the game device 10 to generate the size information and generate the production image 410 corresponding to the size of the path based on the size information. Therefore, the game device 10 can produce effects acceptable to the player corresponding to the size of the path input by the player.

According to this embodiment, since the game device 10 can generate the image 300 in which the production image 410 is displayed in an area differing from the area of the path image 400 by generating the production image 410 differing from the path image 400, various images 300 which differ to a large extent can be generated.

The game device 10 can produce effects acceptable to the player by generating the production image 410 corresponding to the position and the size of the path.

Since the game device 10 can change the production image 410 with time, various effects which differ to a large extent can be produced.

Since the game device 10 can determine shape matching by comparing the input time and the angles, the game device 10 can more efficiently determine shape matching in comparison with the case of comparing the path image 400 with the shape pattern in pixel units. Moreover, the game device 10 can appropriately determine shape matching even if the input shape is complicated (e.g. cloud or nose shape).

The input time of the path data 121 and the time of the shape data 122 may be compared in the positive order (i.e. 0, 1, 2) or the reverse order (i.e. 2, 1, 0), or may be compared in a thinning manner (i.e. 0, 2). This allows the path recognition section 112 to perform appropriate comparison irrespective of the stroke order and the start position of the path input by the player.

Since the game device 10 can generate the path image 400 in association with the indicated position by the pen 20 or the like and determine shape matching after completion of the indication to generate the production image 410 corresponding to the size of the path image 400, a more intuitive effect production can be achieved.

Modification

The invention is not limited to the above-described embodiments. Various modifications and variations may be made.

For example, the size information is not limited to information indicating the length of one side of the rectangular area 500, but may be information indicating the total length of two or more sides of the rectangular area 500. The rectangular area which is the reference of the size is not limited to the rectangular area 500 which encloses the entire path image 400, but may be a rectangular area included in the path image 400 or a rectangular area which includes or is included in a characteristic portion of the path image 400. The size information may be information indicating a length based on such lengths (e.g. the length of a diagonal line which connects the opposing vertices of the rectangular area), or may be information indicating the total of such lengths (e.g. the total of the length of one side of the rectangular area 500 and the length of a diagonal line which connects the opposing vertices of the rectangular area).

For example, when the path image 400 matches the shape of a nose and the game device 10 generates a production image of a sniveling expression, the game device 10 may process the nostril as the characteristic portion. In this case, the size information generation section 113 may generate size information indicating the width of the nostril included in the path, and the image generation section 111 may generate a production image in which the sniveling expression changes corresponding to the width of the nostril.

The combination of the path image 400 and the production image 410 is not limited to the cloud and the raindrops, but may be the nose and sniveling, hips and balloon, bow and arrow, and the like.

In the above-described embodiments, the image generation section 111 changes the position of the production image 410 based on the timing information. Note that the image generation section 111 may generate an image in which at least one of the position, shape, color, pattern, and size of the production image 410 changes with time, for example. The image generation section 111 may generate an image in which at least one of the position, shape, color, pattern, and size of the path image 400 changes with time.

According to this configuration, since the game device 10 can change the path image 400 or the production image 410 with time, various effects which differ to a large extent can be produced.

The path recognition section 112 may determine whether or not the path satisfied a predetermined condition by determining whether or not the color of the path matches a predetermined color or determining whether or not the area enclosed by the path is in a predetermined state.

In more detail, as effect production based on determination of matching the color of the path, the image generation section 111 may generate a production image in which a person goes out when the color of the path is yellow and the shape of the path is a circle (i.e. the path indicates the sun) and generate a production image in which a person goes home when the color of the path is blue and the shape of the path is a circle (i.e. the path indicates the moon). When allowing the user to draw a path while changing the color of the path, the image generation section 111 may generate a color selection image containing a plurality of colors such as red and blue, the input section 193 may generate color selection information indicating the position in the color selection image indicated using the pen 20, and the path recognition section 112 may determine the selected color based on the color selection information.

As effect production based on determination of the area enclosed by the path, the image generation section 111 may generate the production image 410 of raindrops when the path indicates the cloud shown in FIG. 2A, and may generate a production image of a thunderstorm when the cloud is painted out using the pen 20.

The game device 10 may produce sound or light in addition to the image. For example, the sound generation section 115 may generate sound information for outputting sound of which the volume is adjusted corresponding to the size based on the size information, and the sound output section 192 may output sound based on the sound information. In more detail, the game device 10 may output a loud rain sound when the size of the path is large as shown in FIG. 2A, and may output a rain sound at a volume lower than that of the case shown in FIG. 2A when the size of the path is small as shown in FIG. 2B, for example.

This allows the game device 10 to produce sound corresponding to the size of the path.

The game device 10 may produce effects corresponding to the pressure applied to the pen 20 in the same manner as the size of the path. For example, when a high pressure is applied to the pen 20, the game device 10 may produce effects similar to those produced when the size of the path is large. When a low pressure is applied to the pen 20, the game device 10 may produce effects similar to those produced when the size of the path is small. In this case, the input section 193 may generate information including information indicating the pressure applied to the pen 20 as input information.

The invention may be applied to various devices including an image generation system such as a PC, PDA, portable telephone, and television in addition to the game device 10. The input section is not limited to the input section 193 provided in the touch panel display 190, but may be a tablet, a pad of a PDA or the like, a mouse, or the like. The input method may be to input using the finger instead of the pen 20, for example.

In FIG. 1, the game device 10 includes the touch panel display 190 and the display 191. Note that the game device 10 may include only the touch panel display 190. The game device 10 may display the path image 400 on the touch panel display 190 and display the production image 410 on the display 191.

The path image 400 is not limited to a solid line, but may be a dotted line or a line in which points of the path are expressed using a circle or a star, for example.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An image generation method, comprising:
    performing recognition processing of a path input by a user; and
    determining whether or not the path satisfies a predetermined condition; and
    when the path satisfies the predetermined condition, generating at least two images including a path image corresponding to the path and a production image generated by a computer based on a size of the path,
    wherein the generation of the production image includes dividing one of a plurality of lengths of the path image into a plurality of portions of the path image and defining one or more coordinate positions of the production image based on the plurality of portions of the path image.

2. The image generation method as defined in claim 1, wherein the size of the path is at least one of the plurality of lengths including:
    a length of at least one side of a first rectangular area including the path;
    a length of at least one side of a second rectangular area included in the path;
    a length of the path;
    a length of a characteristic portion of the path; and
    a length based on at least one of these lengths.

3. The image generation method as defined in claim 2, wherein
the generation of the production image generates the production image based on a position of the path and one of the plurality of lengths, and
a size of the production image being adjusted based on the one of the plurality of lengths.

4. The image generation method as defined in claim 1, further comprising:
generating timing information,
the generation of the production image generates the production image such that at least one of a position, shape, color, pattern, and size of the production image changes with time, based on the timing information.

5. The image generation method as defined in claim 4, wherein the generation of the path image generates the path image such that at least one of a position, shape, color, pattern, and size of the path image changes with time, based on the timing information.

6. The image generation method as defined in claim 5, wherein the generation of the at least two images comprises generating both the path image and the production image such that the path image and the production image are deleted at a predetermined time, based on the timing information.

7. The image generation method as defined in claim 1, wherein the determination whether or not the path satisfies the predetermined condition comprises determining whether or not the path matches a predetermined shape.

8. The image generation method as defined in claim 7, wherein the determination whether or not the path satisfies the predetermined condition further comprises at least one of: determining whether or not a color of the path matches a predetermined color and determining whether or not an area enclosed by the path is in a predetermined state.

9. The image generation method as defined in claim 7, further comprising:
storing path data for generating the path image, shape data indicating the predetermined shape, and production data for generating the production image,
wherein
the path data indicates an input time, a coordinate position at the input time, and an angle formed by a line segment which connects the coordinate position at the input time and a coordinate position at a preceding input time and a line segment which connects the coordinate position at the input time and a coordinate position at a subsequent input time; and
the shape data indicates the input time and the angle.

10. The image generation method as defined in claim 1, wherein the input by the user and an area in which the at least two images are generated are displayed by a touch panel display.

11. The image generation method as defined in claim 1, further comprising:
generating sound information for outputting sound based on the size information, a volume of the sound being adjusted according to the size.

12. A non-transitory computer readable medium storing a program which when executed by a processor causing a computer to perform the steps of:
performing recognition processing of a path of an input by a user; and
determining whether or not the path satisfies a predetermined condition; and
when the path satisfies the predetermined condition, generating at least two images including a path image corresponding to the path and a production image generated by a computer based on the size of the path
wherein the generation of the production image includes dividing one of the plurality of lengths of the path image into a plurality of portions of the path image and defining one or more coordinate positions of the production image based on the plurality of portions of the path image.

13. An image generation system, comprising:
performing, by a processor, recognition processing of a path input by a user; and
determining, by the processor, whether or not the path satisfies a predetermined condition; and
when the path satisfies the predetermined condition, generating, by the processor, at least two images including a path image corresponding to the path and a production image generated by a computer in accordance with the size of the path
wherein the generation of the production image includes dividing one of a plurality of lengths of the path image into a plurality of portions of the path image and defining one or more coordinate positions of the production image based on the plurality of portions of the path image.

14. The image generation system as defined in claim 13, wherein the size of the path is at least one of the plurality of lengths including:
a length of at least one side of a first rectangular area including the path;
a length of at least one side of a second rectangular area included in the path;
a length of the path;
a length of a characteristic portion of the path; and
a length based on at least one of these lengths.

15. The image generation system as defined in claim 14, wherein
the generation of the production image generates the production image based on a position of the path and one of the plurality of lengths, and
a size of the production image being adjusted based on the one of the plurality of lengths.

16. The image generation system as defined in claim 13, further comprising:
generating, by the processor, timing information,
wherein the generation of the production image generates the production image such that at least one of a position, shape, color, pattern, and size of the production image changes with time, based on the timing information.

17. The image generation system as defined in claim 16, wherein the generation of the path image generates the path image such that at least one of a position, shape, color, pattern, and size of the path image changes with time, based on the timing information.

18. The image generation system defined in claim 17, wherein the generation of the at least two images comprises generating both the path image and the production image such that the path image and the production image are deleted at a predetermined time, based on the timing information.

19. The image generation system as defined in claim 13, wherein the determination whether or not the path satisfies the predetermined condition comprises determining whether or not the path matches a predetermined shape.

20. The image generation system as defined in claim 19, further comprising:

storing, by the processor, path data for generating the path image, shape data indicating the predetermined shape, and production data for generating the production image, wherein the path data indicates an input time, a coordinate position at the input time, and an angle formed by a line segment which connects the coordinate position at the input time and a coordinate position at a preceding input time and a line segment which connects the coordinate position at the input time and a coordinate position at a subsequent input time; and wherein the shape data indicates the input time and the angle.

21. An image generation method, comprising:

an image generation step for generating an image;

a path recognition step for performing recognition processing of a path of an input by a user, based on input information of the input from an input section which allows the user to input an arbitrary shape; and a size information generation step for generating size information indicating size of the path, wherein:

the path recognition step determines whether the path satisfies a predetermined condition, when the path satisfies the predetermined condition, the image generation step generates an image which includes a path image indicating the path based on the input information and a production image in accordance with the size of the path based on the size information, the path image being different from the production image, and the image generation step divides one of a plurality of lengths of the path image into a plurality of portions of the path image and defines one or more coordinate positions of the production image based on the plurality of portions of the path image, in order to generate the image which includes the path image and the production image.

* * * * *